(12) United States Patent
Hall

(10) Patent No.: US 11,057,441 B1
(45) Date of Patent: Jul. 6, 2021

(54) DYNAMIC MULTI-USER MEDIA STREAMING

(71) Applicant: INSPACE PROXIMITY, INC., Colchester, VT (US)

(72) Inventor: Narine Manukyan Hall, Colchester, VT (US)

(73) Assignee: INSPACE PROXIMITY, INC., Colchester, VT (US)

( * ) Notice: Subject to any disclaimer, the term of this patent is extended or adjusted under 35 U.S.C. 154(b) by 0 days.

(21) Appl. No.: 17/189,555

(22) Filed: Mar. 2, 2021

Related U.S. Application Data

(60) Provisional application No. 63/075,182, filed on Sep. 6, 2020.

(51) Int. Cl.
  *H04L 29/06* (2006.01)
  *G06F 3/0488* (2013.01)
  *G06N 20/00* (2019.01)

(52) U.S. Cl.
  CPC ...... *H04L 65/1093* (2013.01); *G06F 3/04886* (2013.01); *G06N 20/00* (2019.01); *H04L 63/101* (2013.01); *H04L 65/4015* (2013.01)

(58) Field of Classification Search
  CPC .............. H04L 65/1093; H04L 63/101; H04L 65/4015; G06N 20/00; G06F 3/04886
  USPC ........................................................ 709/227
  See application file for complete search history.

(56) References Cited

U.S. PATENT DOCUMENTS

| | | | |
|---|---|---|---|
| 8,405,702 B1 | 3/2013 | Gottlieb | |
| 9,041,768 B1 | 5/2015 | Gottlieb | |
| 9,357,169 B2 | 5/2016 | Gottlieb | |
| 9,401,937 B1 | 7/2016 | Gottlieb | |
| 9,800,931 B1* | 10/2017 | Tangeland | H04N 21/4438 |
| 9,952,751 B2 | 4/2018 | Gottlieb | |
| 10,382,498 B2* | 8/2019 | Xi | G06F 3/1454 |
| 10,511,643 B2* | 12/2019 | Faulkner | H04L 67/26 |
| 10,645,294 B1* | 5/2020 | Manzari | H04N 5/232941 |
| 10,747,418 B2* | 8/2020 | Pieper | G06F 3/04842 |
| 10,785,445 B2* | 9/2020 | Clark | H04N 13/204 |
| 2014/0176665 A1 | 6/2014 | Gottlieb | |
| 2014/0229866 A1 | 8/2014 | Gottlieb | |
| 2014/0365620 A1* | 12/2014 | Lindberg | H04L 67/10 709/219 |
| 2015/0301694 A1 | 10/2015 | Gottlieb | |

(Continued)

*Primary Examiner* — William D Titcomb
(74) *Attorney, Agent, or Firm* — Arluys IP, P.C.

(57) ABSTRACT

Techniques are described for dynamic multi-user media streaming for client systems in a media session. In an embodiment, a local client system receives a media stream originated from a remote client system which is in the same media session. The local client system displays a local participant user interface (UI) control representing the local user at a first position on its local UI and further displays, a remote participant UI control representing the remote user on a second position on the local UI. When the local participant UI control is moved to a new position, the proximity to the remote participant UI control changes. Based at least in part on the change in proximity, the media stream originated from the remote client system is modified. For example, as local and remote participant UI controls are moving closer, the local client system may increase the volume of the audio track. Techniques further include other media session interactive features such as UI zones for private interactions.

30 Claims, 10 Drawing Sheets

(56) References Cited

U.S. PATENT DOCUMENTS

| | | | |
|---|---|---|---|
| 2015/0301720 A1 | 10/2015 | Gottlieb | |
| 2015/0304376 A1 | 10/2015 | Gottlieb | |
| 2017/0237788 A1* | 8/2017 | Xi | H04L 65/4038 709/204 |
| 2018/0203587 A1 | 7/2018 | Gottlieb | |
| 2018/0337963 A1* | 11/2018 | Faulkner | H04L 67/26 |
| 2021/0097768 A1* | 4/2021 | Malia | G06F 3/0488 |

* cited by examiner

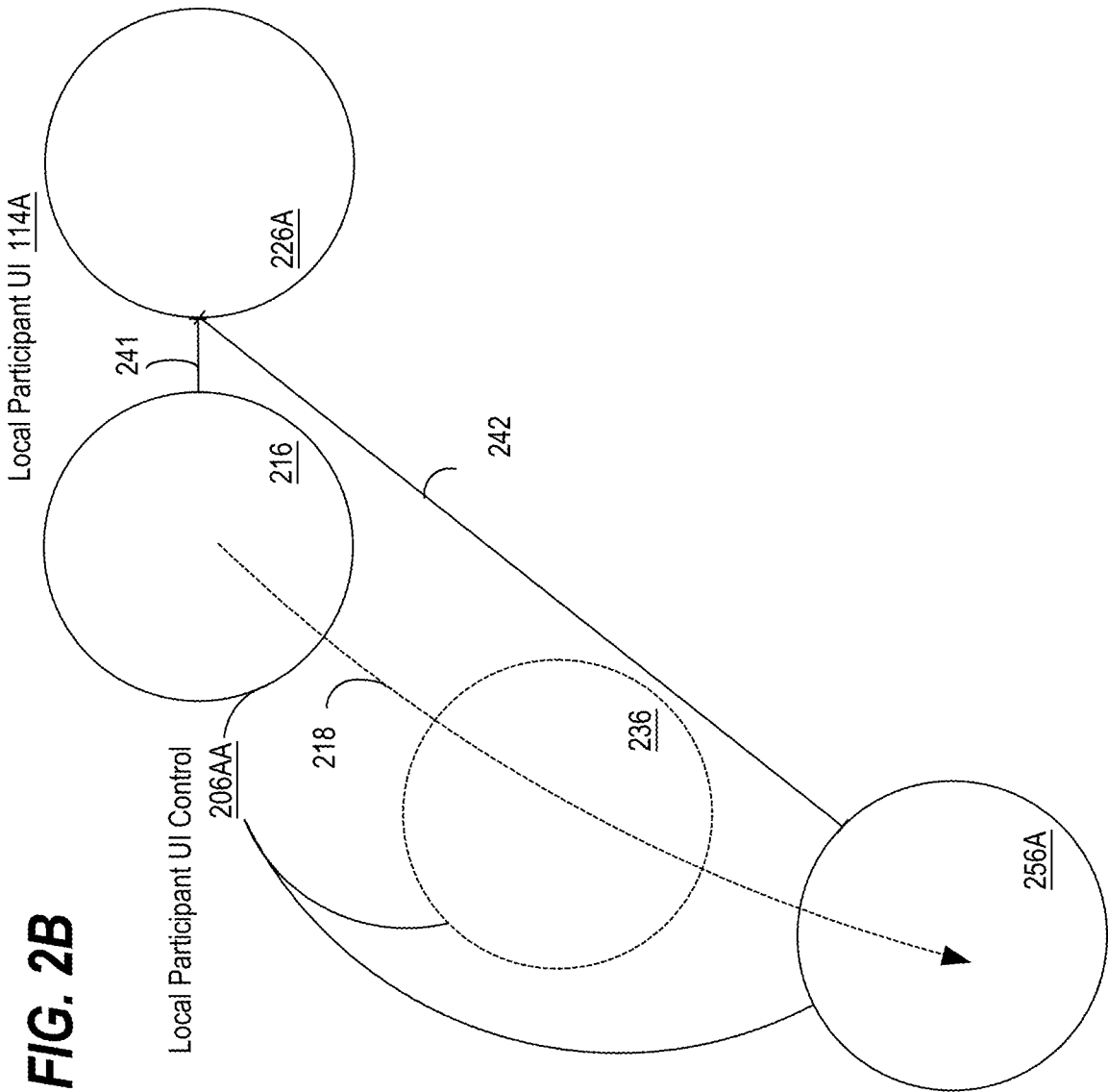

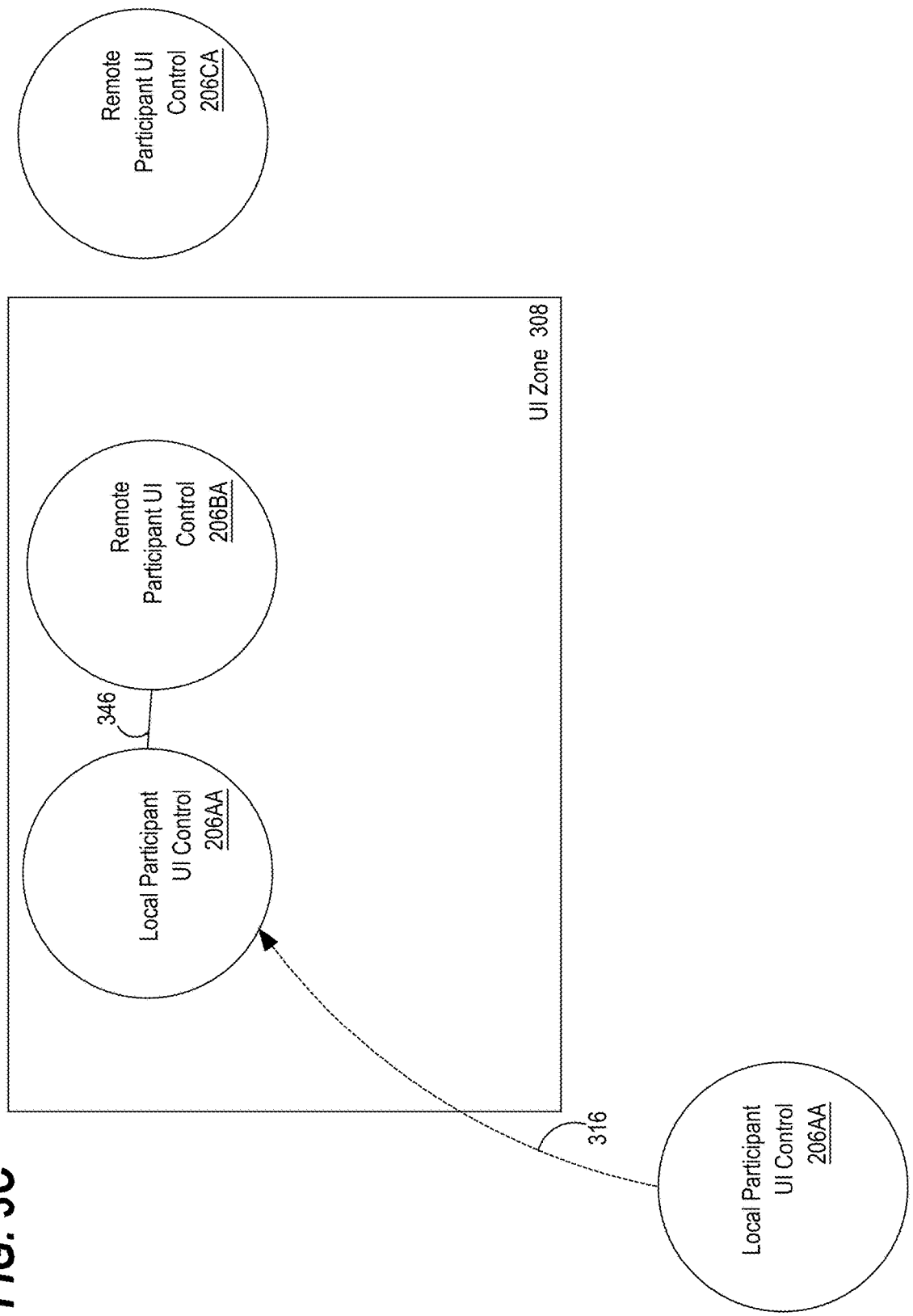

DYNAMIC MULTI-USER MEDIA STREAMING

BENEFIT CLAIM

This application claims the benefit under 35 U.S.C. § 119(e) of provisional application 63/075,182, filed Sep. 6, 2020, the entire contents of which is hereby incorporated by reference for all purposes as if fully set forth herein.

FIELD OF THE TECHNOLOGY

The present invention relates to the field of electronic media streaming technologies, in particular to dynamic multi-user media streaming.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Media streaming solutions for video conferencing lack interactive features to provide users with the ability to dynamically change the user experience of media-based interaction while maintaining the same session. When users connect to a video conferencing solution and establish a video/audio-sharing session, the multimedia experience is generally limited to broadcast. If user audio and/or video capture is shared with the session, then each and every other user connected to the same video-sharing session has no choice but to receive it.

Such video sharing solutions are guided by the presenter-audience paradigm when a single user is denoted as a presenter, while other users connected to the same media sharing session are the audience. The presenter-audience solutions lack the dynamism of interaction and are inadequate for many basic interactive environments.

BRIEF DESCRIPTION OF THE DRAWINGS

In the drawings of certain embodiments in which like reference numerals refer to corresponding parts throughout the figures:

FIGS. 3B-D are block diagrams that depict example UI's with a UI zone, in one or more embodiments;

DETAILED DESCRIPTION

Figure 1:
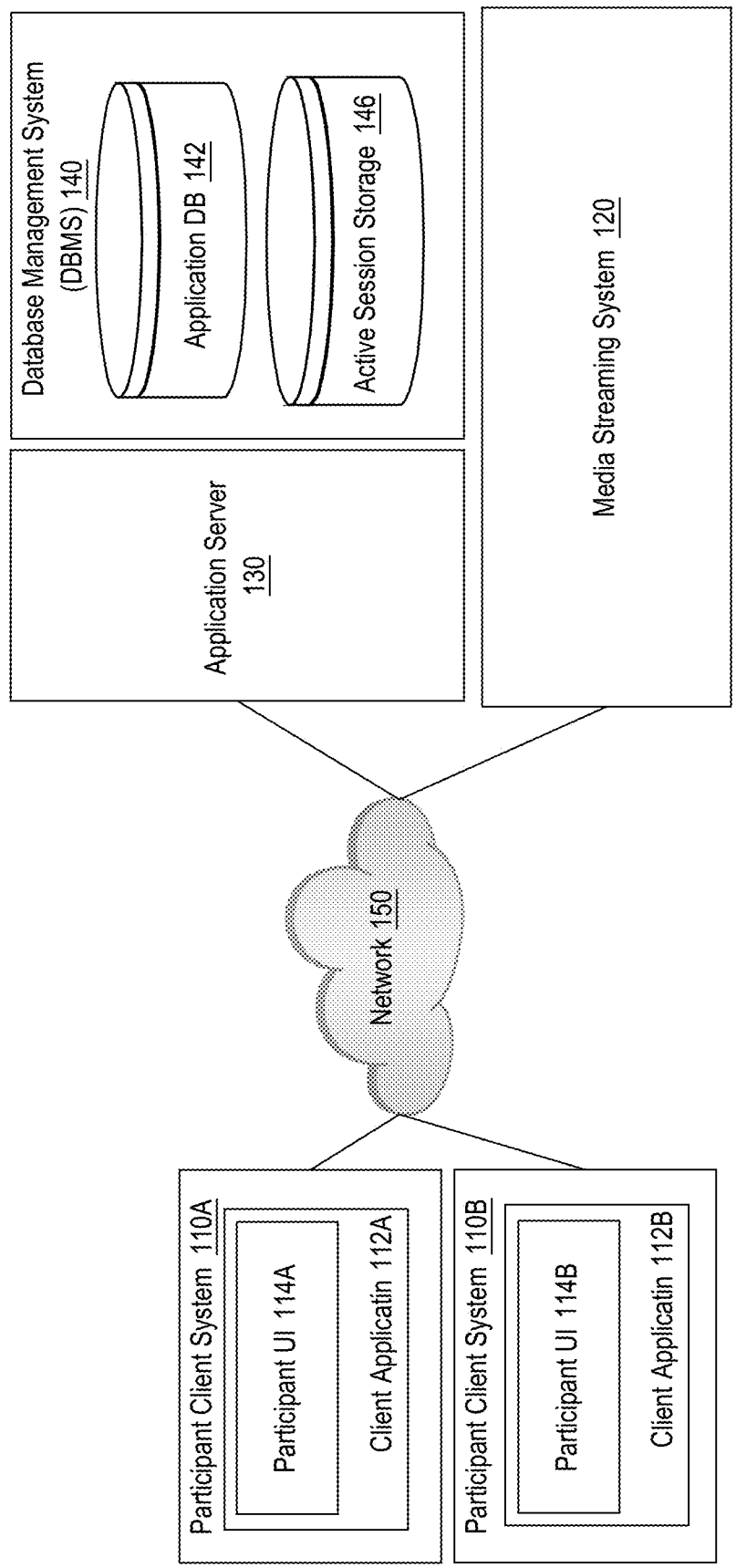
FIG. 1 is a block diagram that depicts a dynamic multi-user media streaming system (DMMSS) 100, in one or more embodiments.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

GENERAL OVERVIEW

The approaches herein describe multi-user media streaming with dynamic user interface (UI) controls and dynamic audio/video streaming techniques. In an embodiment, a user of a client system initiates a media sharing session such as an audio/video conferencing session using dynamic multi-user media streaming system (DMMSS). DMMSS may avail the session for other users of other client systems to participate in the same media session. A client system connected to such a media session sends to and receives media stream(s) from other client computer systems connected to the same media session. The media stream(s) may include a video track, audio track, textual data (e.g., shared documents), and image(s).

In addition to streaming multimedia, DMMSS may share data track(s) with metadata of the media session among the client computer systems participating in the media session. The data track may be used to control the sharing of the media stream for participant client systems in the media session. Based on the received metadata through the data track, the sending participant client system(s), the receiving participant client system(s), and/or the application server of the DMMSS may determine which media stream(s) and what amount of the media stream(s) to reproduce (size, resolution, quality, signal strength/level, etc.).

In an embodiment, the media stream(s) are modified without any change to the underlying communication that is used to stream the media to the receiving client. In such an embodiment, the stream quality/quantity and other properties of the stream during the network data transfer are independent of the metadata of the media session. Accordingly, the requests received to change the UI of the media session has no effect on the communication and the quantity and quality of data transfer thereof.

In an embodiment, the metadata of a media session is generated by a local client system by receiving an input request at the system to interact with the displayed UI representing the media session. The interaction request may indicate a request to move a participant UI control representing the local user on the UI of the local system to another position within the UI. The metadata indicating the move is generated (e.g., as event data including coordinates for the move) and sent to the remote client system(s) of the media session via the data track. The remote client system, upon the receipt of the metadata, may calculate the change in proximity of the remote participant UI control of the remote user with the local participant UI control of the local user. Based on the change in the proximity, the reproduction of the media stream from the local client computer system on the remote client system may change analogous to the modification of the media stream on the local client system.

Conversely, when the remote client computer system receives a request that indicates a request to move a participant UI control representing the remote user on the remote UI to another position within the UI, the metadata indicating the move is generated on the remote client system. The metadata from the remote client system is sent to the local participant system to update the local UI and to adjust the playback of the media stream(s) from the remote system. The local system, upon the receipt of the metadata, may calculate the new proximity of the remote participant UI control of the remote user with the local participant UI control of the local user and update the UI accordingly. Based on the change in the proximity, the reproduction of the media stream(s) from the remote system may change on the local client system.

For example, as the remote participant UI control is moved further away from the local participant UI control, the audio track of the media stream from the remote client system decreases in volume level on the local computer system. The amount of the decrease in the volume may be calculated to be based on the amount of change in the proximity. Conversely, when the remote participant UI control is moved closer to the local participant UI control, the audio track of the media stream from the remote client system may be increased on the local client system.

In one or more embodiments, the modification to the media streams from remote client system may include one or more of: discarding the media stream completely; discarding any video/audio track thereof; adjusting playback of the media stream such as modifying the sound level of an audio track; downgrading (downsampling) video/image track; and/or replacing a video track (or a playback thereof) with an image. Any of the modifications may be performed on the application server of DMMSS to which the client systems are connected for the media session, on the originating participant client system, and/or on the recipient participant client system.

In an embodiment, a media session by the DMMSS is divided into zone streams. The term "zone streams" refers to media stream(s) of user(s), which form a group based on the locations of their respective participant UI controls in the UI(s) of the media session. The term "UI zone" refers to a portion of the UI of a media session that is delineated for forming such a group. The client systems of participant UI controls that are within the UI zone receive each other's media streaming (sound and active engagement) but may not receive, may only partially receive, may receive but not reproduce, or may receive but only partially reproduce the media streaming from client system(s) which respective participant UI controls are outside the UI zone. Accordingly, the client system of the UI zone may discard (e.g., fails to receive or fail to reproduce) media streams from the participant client system(s), which corresponding participant UI controls are outside of the UI zone.

In an embodiment, in which the client system receives non-zone media streams from client systems but fails or only partially reproduces the media streams, no change to the communication with such client system(s) are made. The media streams may be simply discarded/ignored/modified from the client system(s) by failing to send, failing to reproduce and/or partially reproducing them on the recipient client system without any change to the communication with the client(s).

In an embodiment, a local client system receives an interaction request to move a local participant UI control from outside of a UI zone into the UI zone on the local UI of a media session. The local client system determines the new position of the local participant UI control. If the new position has moved within a UI zone that includes another remote participant UI control of a remote client system, then the local client system sends its media stream of the media session to the remote client system and/or playbacks the media stream received from the remote client system. However, if the remote participant UI control is outside of the UI zone while the local participant UI control is within the UI zone, the media stream from the remote client system of the UI zone is at least in part discarded. For example, the audio track from the remote client system may be muted on the local client system (or blocked by the application server of DMMSS or the remote client system itself). When the remote participant UI control moves back inside the UI zone, the media streaming of the media session between the local and the remote client systems is re-established.

Accordingly, within a media session, one or more private sessions of media streams may be created amongst the participant users using UI zones. To broadcast to all participants of the media session in such an embodiment, a local client system may receive an interaction request from the local participant user to share at least a portion of its media stream with all participants (e.g., a request to broadcast the media stream). When such a request is received (and in some cases, approved), at least a portion of the media stream of the local participant is sent and caused to playback on all participant client systems of the media session, regardless of their respective participant UI control positions on the UI (even if the participant UI control is within a UI zone).

In an embodiment, a remote client system receives a request to share one or more video streams with one or more other participant client systems in a media session with the remote system. Once shared, the video stream may be received by the other participant client systems in the media session (regardless of the proximity or UI zones). On the local UI of a local client system, the shared video streams may be displayed at the location of the corresponding remote participant UI control or within the UI zone in which the remote participant UI control is located. Due to proximity or different UI zones, the local client system may not receive and/or playback the non-video tracks (e.g., audio track) of the remote system while still displaying at least a portion of the video stream from the remote system (e.g., full, downsampled, or a thumbnail image).

The DMMSS may further provide a screen share video stream that allows multiple participant client systems to share their display screen stream in the same session to be displayed on participant UI's of the participant client systems. The shared screen may be displayed on a UI of the media session in any shape and may be controlled by the originating participant client system.

The participant client systems in the media session may receive and display each video stream or a subset thereof. The selection of which subset to view may be performed by the participant's client system's zoom in/zoom out interaction input request on the respective UI. The zoom in/out requests of the local UI may perform a zoom function for the background and/or for individual participant UI controls (which may be streaming the respective video/image stream).

SYSTEM OVERVIEW

FIG. 1 is a block diagram that depicts a dynamic multi-user media streaming system (DMMSS) 100, in one or more embodiments. DMMSS 100 includes application server 130, which is connected to database management system (DBMS) 140 that hosts application database 142 and active session storage 146. Application server 130 services requests from participant client systems, such as participant client systems 110A and 110B. Application server 130 transmits to participant client systems the non-streamable UI elements for participant UI's 114A/B of a sharing session (e.g., background, participant UI controls, UI frames around participant UI controls, and others). Application server 130 may generate and transmit the non-streamable UI elements to the participant client system to display in participant UI's 114A/B based on the data stored in application database 142 of DBMS 140.

In an embodiment, participant UI's 114A/B may be customized with background images for at least a portion of the UI space, for example setting the background to be a campus building or any other picture.

In an embodiment, client application 112A of participant client system 110A requests to initiate a media sharing session with participant client system 110B. Although only two participant client systems 110A/B are depicted, other embodiments may include more than two systems. In fact, a practical environment may have many more, perhaps several dozens or hundreds of the aforementioned elements.

To establish a session, client application 112A authenticates with and connects to application server 130 through network 150. Application server 130 may request media streaming system 120 to establish a streaming session with client application 112A of participant client system 110A through network 150. The streaming session is established with participant client system 110A when media is streamed from participant client system 110A to media streaming system 120. Application server 130 may store the newly established session information in active session storage 146.

Client application 112B of participant client system 110B may connect to application server 130 and provide an identifier for the requested media sharing session. In an embodiment, application server 130 uses the provided identifier to request media streaming system 120 to establish a streaming session denoted by the identifier with client application 112B of participant client system 110B. Such a session identifier may at least in part identify the socket identifier to which client system 110A for the media session.

In such an embodiment, client system 110B is requesting to connect to the same media session as client system 110A. Application server 130 may request media streaming system 120 to share the media sharing session of client application 112A with participant client system 110B and conversely, to share the media sharing session of client application 112B with participant client system 110A. Thereby, the requested media sharing session is established between client applications 112A/B of participant client systems 110A and 110B, respectively, and managed by application server 130.

The media session is interactively represented by participant UI's 114A/B on client applications 112A/B of participant client system 110A/B, respectively. For example, participant UI 114A may display participant UI controls representing the users of participant client systems 110A/B and a media stream (e.g., a camera video stream) received from client application 112B of participant client system 110B.

In an embodiment, in a media sharing session, the media stream(s) of each client application is identified by the participant identifier. Each media stream may include multiple media tracks, such as audio, video, and data tracks. For example, a media stream of client application 112A may include one or more of the following participant client system 110A's tracks: mono soundtrack, left stereo soundtrack, right stereo soundtrack, camera video track, screen sharing video track, document sharing data, or video track.

In an embodiment, participant client systems 110A/B receive metadata about media session through a data track of the media session. The metadata about the media session includes the state of the participant's UI (e.g., client application 112B receives the state of participant UI 114A of participant client system 110A) and may be based on the interaction requests received to change the state of the participant's UI. For example, participant client system 110A may receive requests for interaction with participant UI 114A to move the participant UI control (and/or change the background image of participant UI 114A). The participant client system, alternative to or in addition to processing the request, forwards such interaction request data, through the data track, to client application 112B of participant client system 110B (e.g., through application server 130). Conversely, interaction request data from participant client system 110B is forwarded to client application 112A of participant client system 110A. The interaction request data may be caused by receiving interaction request by participant client systems 110A/B through input devices such as a mouse, keyboard, touchpad, or touchscreen, causing the corresponding rearrangement of UI controls on UI 114A/B, respectively.

FUNCTIONAL OVERVIEW

Figure 2A:
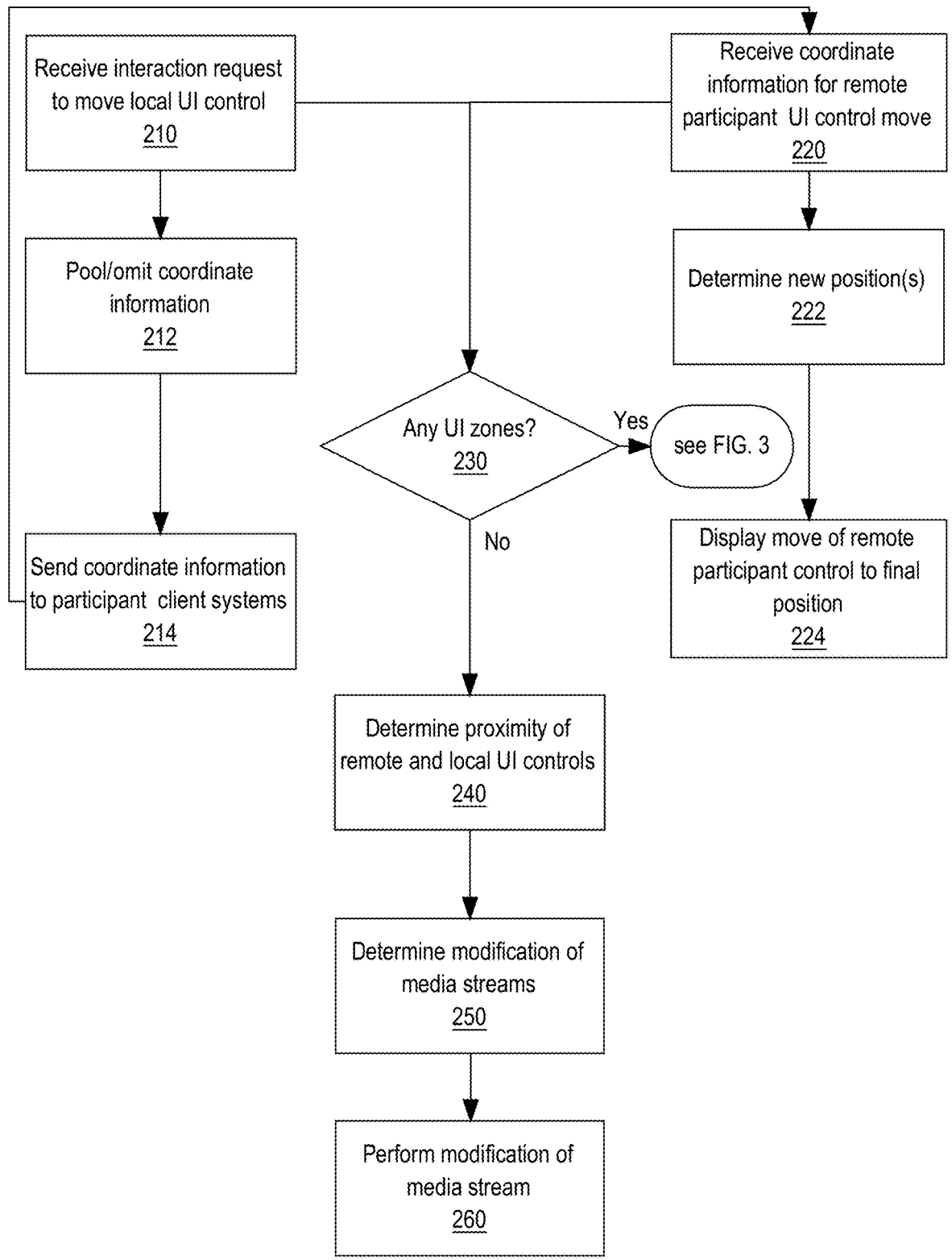
FIG. 2A is a flow diagram that depicts a process for user interface (UI) state-based media stream modification, in an embodiment.

FIG. 2A is a flow diagram that depicts a process for UI-state based media stream modification, in an embodiment. The UI-state may be determined in part by the location of participant UI controls on the UI's for the media session. One or more of the steps described below may be omitted, repeated, and/or performed in a different order. Accordingly, the specific arrangement of steps shown in FIG. 2A should not be construed as limiting the scope of the invention.

PARTICIPANT UI CONTROL

A user of each client computer system that is part of the media session is represented by a participant UI control on the respective UI of the session. For example, local user A of a local client computer system 110A has initiated a media session with a remote user B of a remote client computer system 110B.

Figure 2C:
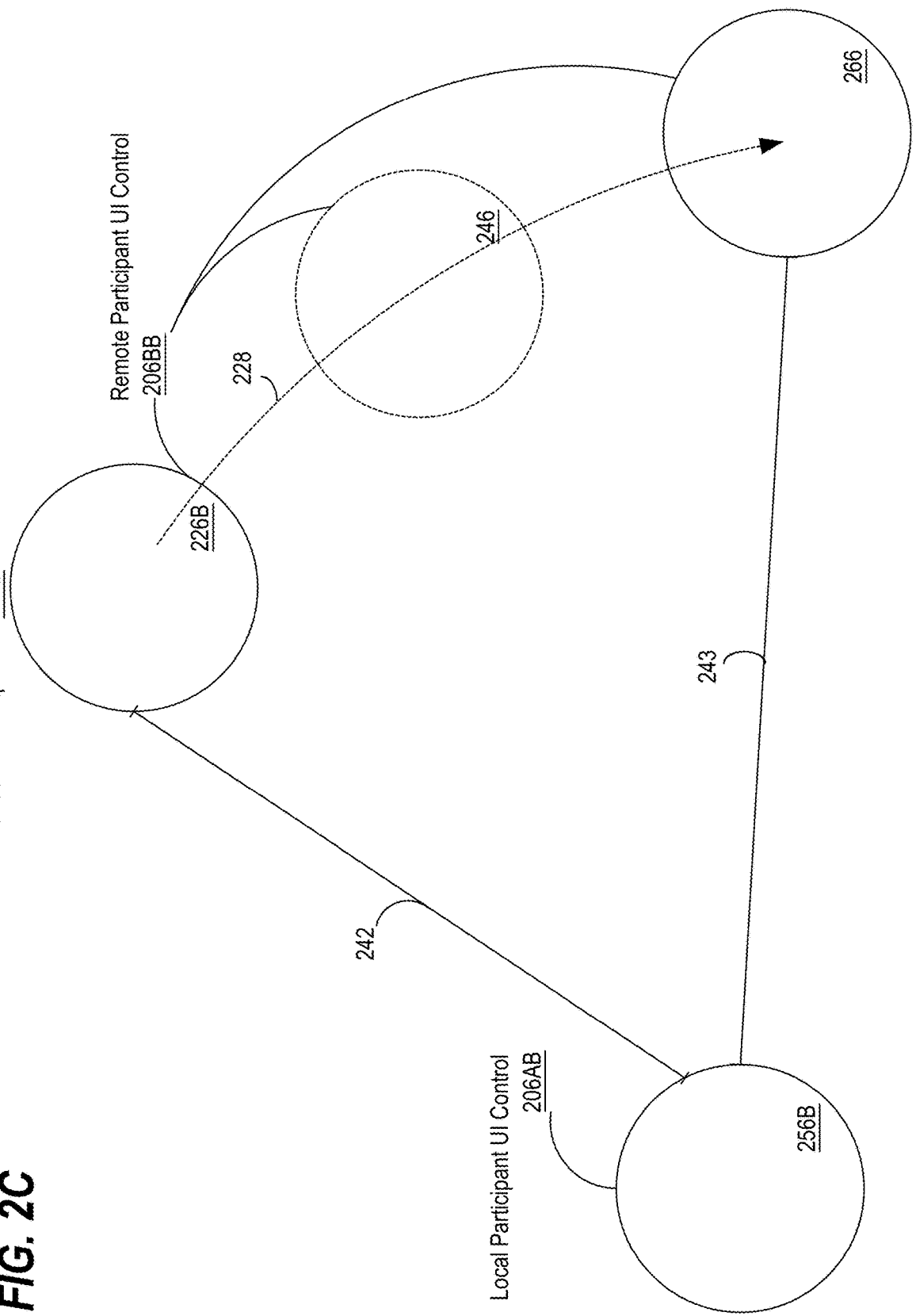
FIGS. 2B/C are block diagrams that depict participant UI's for a media session as displayed on respective client systems participating in the media session, in an embodiment.

FIGS. 2B and C are block diagrams that depict participant UI's (114A and 114B) for a media session as displayed on respective client systems participating in the media session, in an embodiment. User A may be represented with participant UI control 206AA on participant UI 114A (FIG. 2B) and on the remote participant UI 114B on remote system 110B, with corresponding participant UI control 206AB (FIG. 2C). Similarly, remote user B is represented by remote participant UI control 206BA displayed on local UI 114A, and on its system 110B's remote UI 114B by a corresponding remote participant UI control 206BB (FIG. 2C).

Such participant UI controls may display any type of media, like participant live videos, media like browser-enabled apps or web pages, programs that enable collaborative coding or writing of the text, and more. Although displayed as circles in the example depicted in FIG. 2B, a participant UI control may be of any shape of a UI control such as a star, pumpkin, triangle, Christmas ornaments, and pomegranate. Additionally, the participant UI control may have UI sub-control elements that are separately controlled by the corresponding user, such as visual control of raising hand controlled by the corresponding user's input.

MODIFYING UI STATE

In an embodiment, DMMSS 100 provides real-time rendering and visualization of participant UI controls on the UIs of the participants. The UI of the participant client system is configured to provide controls for dynamically moving the corresponding participant UI control.

Continuing with FIG. 2A, at step 210, local client system 110A receives an interaction input request from user A to move participant UI control 206AA on local UI 114A. Continuing with the example in FIG. 2B, local participant UI client 206AA may be moved along path 218. While receiving interaction requests for the move, computer system 110A may update local UI 114A and display the move of participant 206AA to position 236 and eventually to position 256A along path 218. Concurrently, local system 114A may send information about the requested interaction to remote system 110B to reflect the move by the corresponding participant UI control of 206AA on remote UI 114B.

In an embodiment, participant UI controls are rendered using a pooling mechanism that allows fast visualization of the movements of a local participant UI control for each remote client computer system in the media session. Continuing with FIG. 2A, at step 212, local client system 110A may pool coordinate information rather than sending the coordinates of each position of participant UI control 206AA or omit such coordinate information altogether. Doing so, DMMSS 100 avoids burdening the network with multiple calls, and client systems 110A/B and application server 130 with extra processing for the UI state change due to extra position(s) of participant UI control(s). Similarly, the pooling or omission may be done when application server 130 receives the coordinate information from local client system 110A.

For example, continuing with FIG. 2B, rather than processing and sending position 236 coordinate information and then separately position 256A, thereby making two calls, and processing two changed UI states for media stream modification, local client system 110A may pool the coordinate information of positions 236 and 256A together or omit position 236 coordinate information from sending.

In one embodiment, the determination for a new position is based on the distance that local participant UI control has moved. For example, the distance between initial position 216 of local participant UI control 206AA and position 236 may be below a threshold for separately sending coordinates of position 236 or, stated differently, is within the threshold for pooling. Therefore, position 236 coordinate information may be recorded but not sent to other remote client computer systems in the media session.

Unlike position 236, the distance from position 256A to initial position 216 of local participant UI control 206AA for the move along path 218 is above the threshold for sending coordinate information (or above the threshold for pooling the coordinate information) for at least position 256A. Therefore, local client system 110A may send either only position 256A for the move along the path 218 or pooled information of recorded position 236 and newly acquired position 256A. The threshold may be at least partially based on the size of UI, first UI 114A.

Additionally or alternatively, at step 212 of FIG. 2A, pooling or omission of intermediate position(s) may be based on the time duration of the move. For example, continuing with FIG. 2B, if the time duration of interaction request for moving participant UI control 206AA from initial position 216 to position 236 along path 218 is below a threshold, then position 236 is pooled with later position coordinates, e.g., position 256A, or altogether omitted.

At step 214, the coordinate information for the move (pooled or otherwise) is sent through the data track to other client systems participating in the media session. Accordingly, for example, local client system 110A sends pooled information containing coordinates for positions 236 and 256A to participant client system 110B to similarly update remote UI 114B reflecting the move of participant UI control UI 206AA on local UI 114A.

As depicted on FIG. 2A, the sent coordinate information for a change of the UI state is received, through the data track, at step 220 by remote client systems in the media session. Conversely, when a remote participant UI control is moved on the remote UI, the coordinate information is received by local client system 110A at step 220.

At step 222, the coordinate information received from a remote client system is used to determine how to display the movement of the corresponding remote participant UI control on the local UI of the local client computer system at step 224. To avoid abrupt "jumps" of remote participant UI control on the local UI, local client system 110A may derive intermediate coordinates that are in addition to the coordinate information received from the remote participant UI. Requiring fewer coordinates without sacrificing the user experience (the smoothness of the move by the remote participant UI control) frees up the resources of the network and the originating remote client system.

For example, continuing with FIG. 2C that depicts remote participant UI 114B, remote client system 110B receives an interaction request from user B to move its participant UI control 206BB from position 226B to position 246 and eventually to position 266 on UI 114B. Using techniques described for steps 210, 212, and 214 of FIG. 2A for generating coordinate information, local client system 110A receives at least the coordinate information of position 266 (and in some embodiments, pooled with coordinate information of position 246) at step 220.

In an embodiment, determining coordinates for at least one intermediate position is performed by a machine learning model. Such a machine learning model is trained based on a training data set that includes a feature vector with the initial coordinate and the final coordinate of a performed UI control move and the recorded intermediate coordinate(s) for the move. The training data set with labels may be compiled based on previous interactions with DMMSS 100. When local client system 110A receives new coordinate information from remote client system 110B, the final coordinates of the coordinate information is provided to the machine learning model along with other information, if necessary. The machine learning model outputs one or more intermediary coordinates at step 222. In an alternative embodiment, at step 222, the intermediate coordinate(s) are determined through a linear regression of start and end known coordinates. At step 224, local client system 110A displays the move of remote participant UI control 206BA based on the received coordinate information and one or more calculated intermediate coordinates.

PROXIMITY-BASED STREAM MODIFICATION

When the UI state of a media session is modified, the modification may affect the playback of one or more media streams on a client system (e.g., a sound level of an audio stream). In an embodiment, the modification is triggered by a change in the proximity of positions of participant UI controls representing users in the media session. In another embodiment, the modification may be triggered based on the location of a participant UI control on the UI of the media session. In an embodiment, the modification in the UI state affects only the playback without any change to the underlying communication between the client systems.

Continuing with FIG. 2A, after DMMSS 100 receives interaction request(s) with at least one of the participant UI's of the media session at steps 210 and/or 220, DMMSS 100 determines whether the interaction requests have caused a modification in any one of the media streams.

In an embodiment, media stream(s) received from a remote client system or media stream(s) sent to a remote client system are modified based on the change in proximity of the respective local and remote participant UI controls. Additionally or alternatively, the modification of the media stream(s) may be based on UI zone(s) for the media session. At step 230, the process may determine whether a UI zone is indicated for the media session. If it is determined that no such delineation exists, the process proceeds to step 240.

At step 240, DMMSS 100 determines the proximity of remote and local UI controls. The calculated proximity is used at step 250 for DMMSS 100 to determines the amount of modification and the media streams to modify based on the change in proximity. At step 260, DMMSS 100 performs the modification. In an embodiment, the media stream(s) are modified in proportion with the change in proximity. For example, the closer participant UI controls are, the higher is the audio level of the audio stream playback and the further participant UI controls are, the lower is the audio level of the audio stream playback.

The modifications based on interaction requests (with or without UI zones) may be performed by the originating client system (e.g., remote client system 110B), application server 130, and/or the receiving client system (e.g., local client system 110A). In an embodiment, the modifications to the media streams are performed without any change to the underlying communication. The interaction requests may cause neither the quality of data transfer nor quantity of data transfer to change between the client systems. Other factors may affect the communication link independently from the interaction requests(s).

Continuing with FIGS. 2B/C, initially, local participant UI control 206AA is in close proximity with remote participant UI control 206BA represented by distance 241 on local UI 114A in FIG. 2B. In FIG. 2C, same distance 241 is reflected on remote UI 114B between local participant UI control 206AB and remote participant UI control 206BB. At such a UI state, the audio level of the audio track from remote client system 110B played back on local client system 110A may be at its maximum. Similarly, the audio level of the audio track of the media stream from local client system 110A played back on remote client system 110B may be at its maximum as well.

Local client system 110A receives interaction requests, which causes local participant UI control 206AA (and corresponding local participant UI control 206AB) to move from position 216 to 256A in FIG. 2B (position 256B on remote UI 114B in FIG. 2C). At the new position, the distance between the local and remote participant UI controls grew from distance 241 to distance 242. Accordingly, as an example, the audio level on local client system 110A and remote client system 110B may be lower in proportion to the change in the proximity.

The proximity between local and remote participant UI controls may further change due to the remote participant UI control movement on the remote UI. For example, in FIG. 2C, such a movement by remote participant UI control 206BB is depicted by path 228, which depicts a change in position from position 226B (corresponding to position 226A in FIG. 2B) to 266 on remote participant UI 114B. The move changes the proximity of local participant UI control 206AB to remote participant UI control 206BB from distance 242 to distance 243. Continuing with the above example, at this point, the distance may be so far that the audio stream from remote client system 110B is completely discarded on local computer system 110A.

In an embodiment, the proximity of participant UI controls is calculated based on pixel distance. If different UI's of client systems participating in a media session have different resolutions, then a particular screen resolution is selected, and each UI's pixel distances are converted in proportion to the difference of the UI of the client system and the particular screen resolution.

In an embodiment, DMMSS 100 may maintain configurable thresholds for proximity for which media stream(s) are kept unchanged and/or completely discarded. For example, minimum threshold proximity (e.g., 150 pixels) is configured for reproducing the full (without modification) media stream(s) from a remote participant UI control when the remote participant UI control is located closer than the minimum threshold to the local participant UI control. Similarly, maximum threshold proximity (e.g., 700 pixels) is configured to discard media stream(s) when a remote participant UI control is located further than the threshold from the local participant UI control.

Continuing with the example in FIG. 2C, at distance 243 between local participant UI control 206AA and remote participant UI control 206BA, the audio stream may be set to the zero value (no audio) for sound based on the appropriate threshold (e.g., 700 pixels). At distance 241 between local participant UI control 206AA and remote participant UI control 206BA (e.g., 150 pixels), the audio stream has full volume for sound.

Between the minimum and maximum thresholds, in such an embodiment, the amount of modification of media stream(s) are based on the new proximity distance between the local participant UI control and each and every remote participant UI controls. The remote participant UI controls that are outside the thresholds may be ignored for the proximity calculation to save computing resources.

In an embodiment, coordinate information of the respective UI controls is used to calculate the proximity of UI controls. For example, for DMMSS 100 displaying the local participant UI control at a position denoted as $(x_1, y_1)$ and the remote participant UI control at a position as $(x_2, y_2)$, DMMSS 100 calculates the distance between these positions with the following formula: $((x_2-x_1)^2+(y_2-y_1)^2)^{(1/2)}$.

In a related embodiment, the modification amount to a received media stream may be calculated based on the remote participant UI control's position within the preconfigured maximum and minimum distance of the local participant UI control. For example, the following formula is based on the preconfigured thresholds of [150 px, 700px]: y=kx+b, where k=−1/550, b=14/11 (the coefficient values in the previous formula are calculated from the following equations: 150x+y=1, 700x+y=0).

UI ZONES

In an embodiment, DMMSS 100 may delineate UI zones within the UI for private media sessions within a media session. DMMSS 100, when configured to have the teamwork mode active, causes the display of one or more delineated UI zones of the session UI as isolated from one another. Accordingly, all the users represented by the participant UI controls within a particular UI zone of a media session may privately engage with each other.

In an embodiment, DMMSS 100 may be configured to notify and assign the participant UI controls to the UI zone(s). For example, the UI zones may be assigned to the participant UI controls based on the corresponding users' common characteristics. Non-limiting examples include the topic assigned to the UI zone and the participants' academic ability level or other criteria. Depending on the goal of the session, users that may be weaker in the discussed subject matter within the UI zone may be grouped in one group and strong ones in another; or add one strong user to each UI zone to carry an effective discussion.

Alternatively, DMMSS 100 may randomly and evenly assign all participant UI controls to the UI zones and/or use an algorithm to assign participants to the UI zones evenly.

Participant UI controls may easily be moved in and out of UI zone(s). In an embodiment, participant computer systems on the same session receive information for all the UI zones in the media session.

In an embodiment, a local client system, whose local UI control is outside of a UI zone, may not receive the zone media stream(s) of the UI zone (media streams originating from the participant client systems, whose participant UI control(s) are inside the UI zones). Conversely, a local client system, whose participant UI control is inside of a designated UI zone, may not modify the zone media stream(s) but may modify at least in part media streams from other client systems with UI controls outside of the UI zone. In an embodiment, the sound levels of the streams from the participant client system streams whose participant UI controls are within the UI zone, are set to the maximum and/or set based on proximity techniques described above. The audio track(s) for the streams originating from remote client systems with UI controls that are outside of the UI zone may be completely discarded.

Figure 3A:
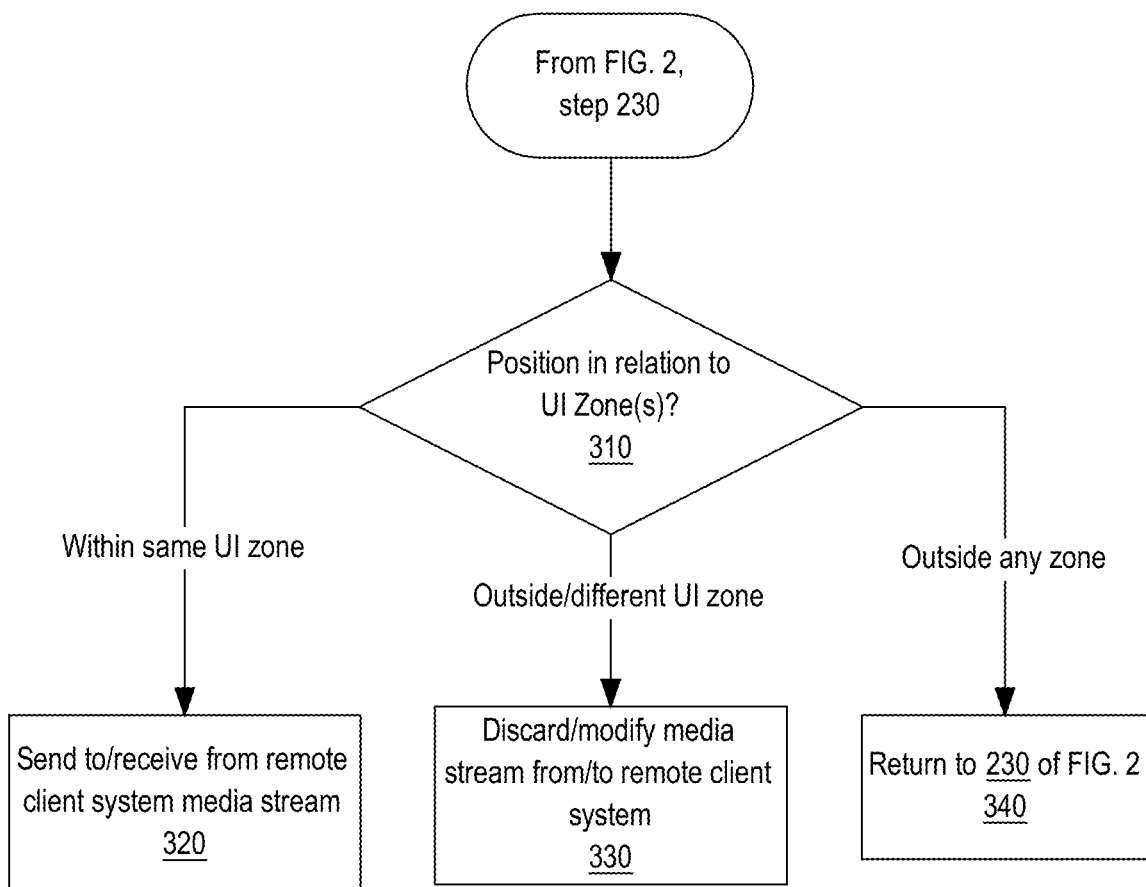
FIG. 3A is a flow diagram that depicts a process for modifying media streams of a media session based on UI zone(s), in an embodiment.

Continuing with FIG. 2A, when the UI for a media session is determined to have UI zones, the process may proceed to FIG. 3A. FIG. 3A is a flow diagram that depicts a process for modifying media streams of a media session based on UI zone(s), in an embodiment. One or more of the steps described below may be omitted, repeated, and/or performed in a different order. Accordingly, the specific arrangement of steps shown in FIG. 3A should not be construed as limiting the scope of the invention.

At step 310, DMMSS 100 determines whether remote participant UI control 206BA is within the same UI zone, outside or in a different UI zone, or outside any UI zone with local participant UI control 206AA.

If it is determined that local participant UI control 206AA and remote participant UI control 206BA are both outside of any UI Zone, at step 310, the process proceeds to step 340 and thereby returns to step 230 of FIG. 2A. In such a scenario, the proximity-based techniques are used as described above for FIG. 2A-C.

If it is determined that local participant UI control 206AA is outside the UI zone in which remote participant UI control 206BA at step 310, local client system 110A discards or modifies at least in part media streams from remote system 110B that is within the zone.

Figure 3B:
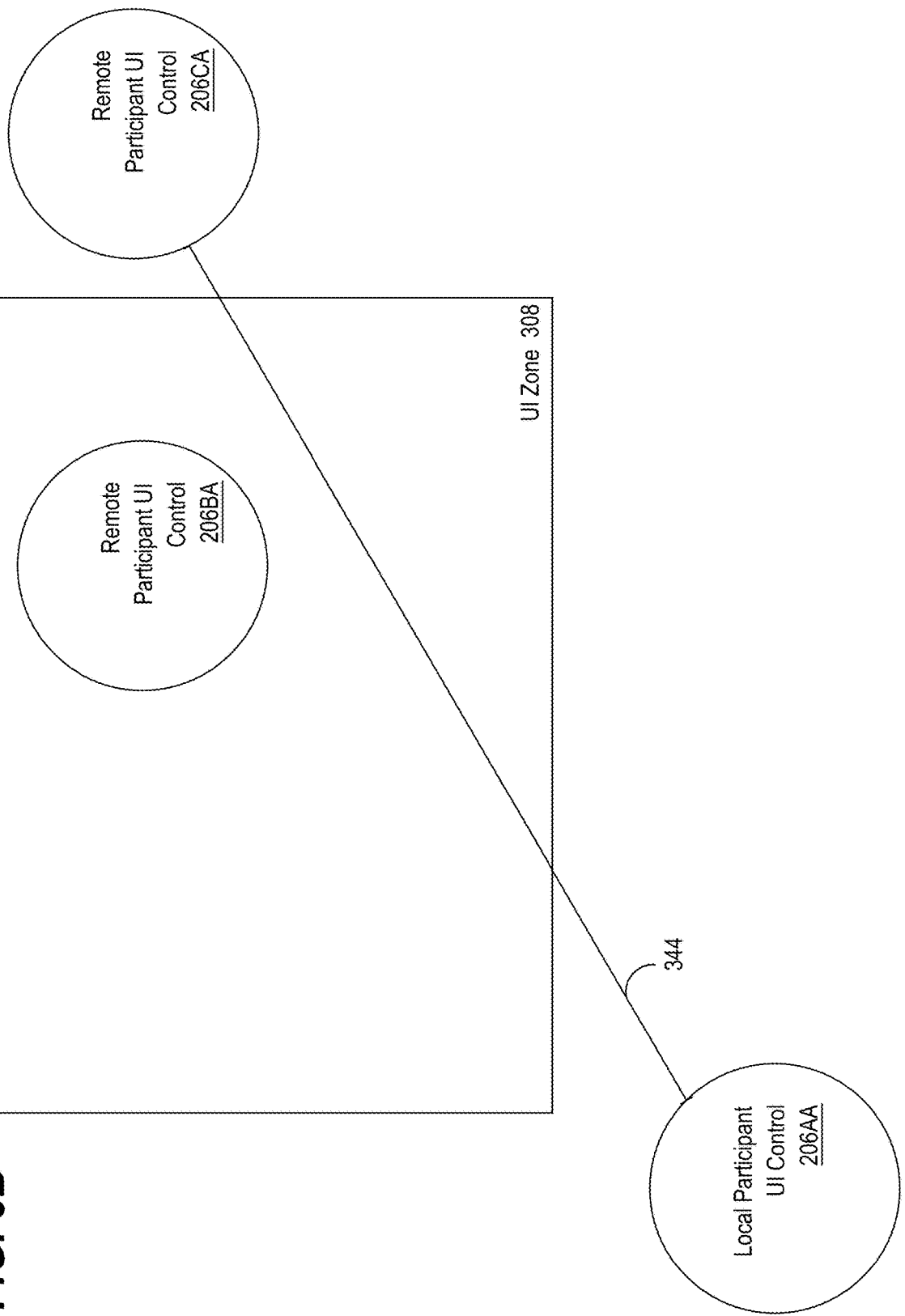
Figure 3D:
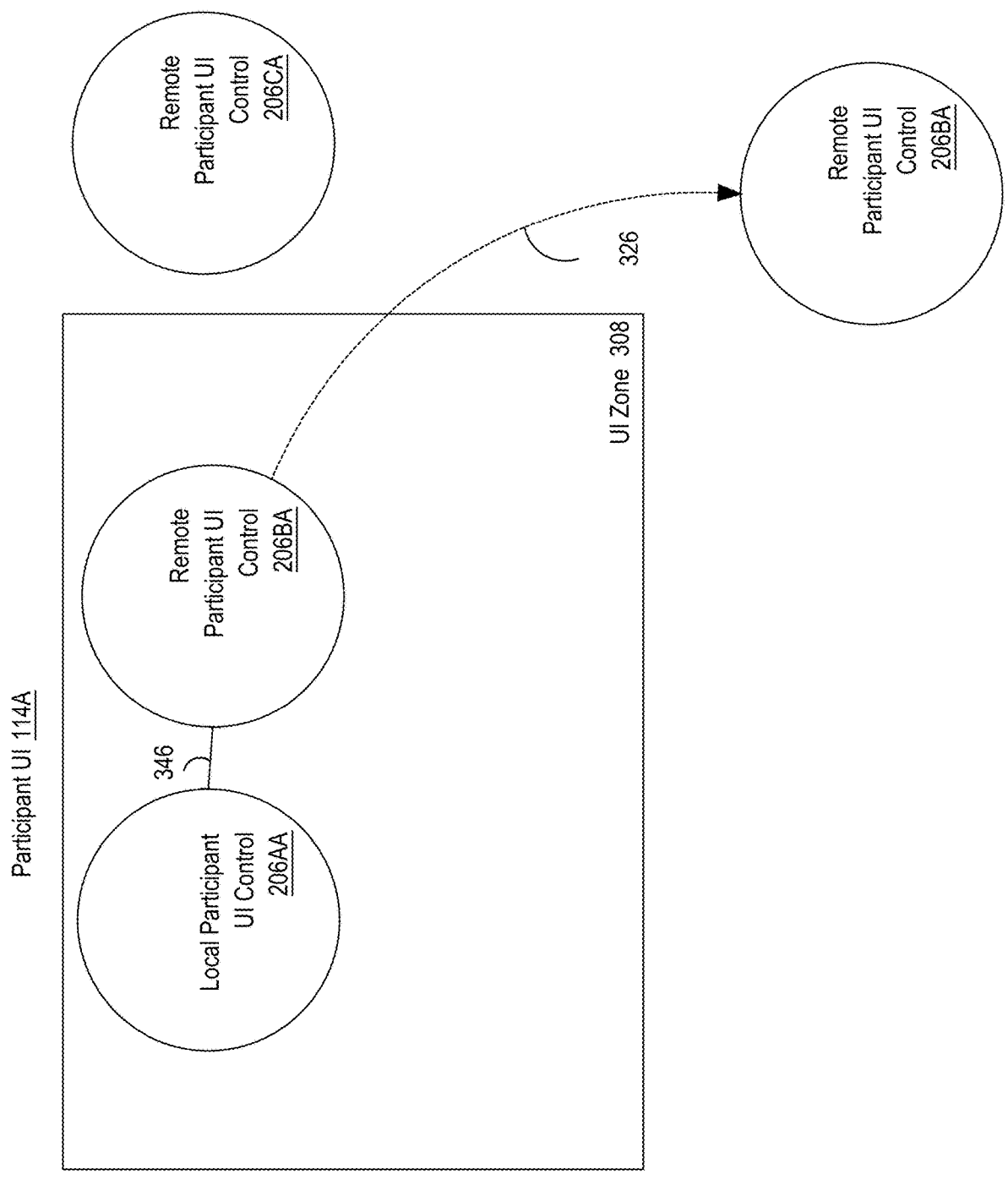

FIGS. 3B-D are block diagrams that depict example UI's with a UI zone, in one or more embodiments. In FIG. 3B, remote participant UI control 206BA is within UI zone 308, while local participant UI control 206AA is outside UI zone 308 on local participant UI 114A. Accordingly, local client system 110A may not send its audio stream to remote system 110B and/or may discard any audio stream received from remote system 110B, as an example.

On the other hand, remote participant UI control 206CA is outside UI zone 308 as well. If it is determined that local participant UI control 206AA and another remote participant UI control are outside the UI zone at step 310, then the proximity-based techniques may be applied to the respective stream based on distance 344.

Continuing with FIG. 3A, if, at step 310, it is determined that local participant UI control 206AA is in the same UI zone with remote participant UI control 206BA, the process proceeds to step 320. At step 320, when client system 110A enters the UI zone, DMMSS 100 may initiate the receipt or sending media streams from and to remote system 110B by local client system 110A. In an embodiment, the newly sent/received media stream(s) may be modified based on the proximity of the respective UI controls within the UI zone.

For example, in FIG. 3C, based on an interaction request to client system 110A, local participant UI control is moved inside UI zone 308 as depicted by arrow 316. Once local participant UI control 206AA is within UI zone 308, client system 110A may send its own audio stream and/or receive the audio stream from remote system 110B. Client system 110A may amplify the audio streams to the maximum level regardless of the proximity between the UI controls within UI Zone 308, or alternatively, determine the volume level of the audio stream(s) may be based on distance 346 within UI zone 308.

As a further example, in FIG. 3D, based on received coordinate information from remote system 110B, remote participant UI control 206BA is moved outside UI zone 308 depicted by path 326. Accordingly, local participant UI control 206AA is within UI zone 308, but remote participant UI controls 206BA\CA are outside. As described for step 330, local client system 110A initiates discarding of the audio stream, as an example, from client system 110B and/or precluding sending its own audio stream to client system 110B, when remote participant UI control 206BA moves outside UI zone 308.

Although FIG. 3B-3C describe examples of modifying/discarding one or more audio streams, the movement of participant UI controls over UI zone(s) may cause the same modification to other types of media streams. For example, at step 330, the remote UI control may be modified to display a thumbnail image rather than a video stream.

In an embodiment, DMMSS 100 provides a broadcast feature that enables a participant to communicate actively (e.g., audio track) with all the participants in the session regardless of their proximity or location on the UI (e.g., regardless of UI zones). In an embodiment, DMMSS temporarily disables the participant UI control's proximity-based and UI zone communication characteristics. After doing so, the stream(s) received from the broadcasting participant client system are broadcasted to all the participant client systems in the session regardless of UI zones and/or proximity.

MEDIA SHARING

Multiple multimedia streams may be transmitted to and from a client system of a media session. Thus, if a client system has multiple cameras (e.g., an embedded camera and external camera), the output audio/video streams from both cameras may be part of a media sharing session.

Screen sharing of a participant client system is considered as another video stream in the solution and may be streamed in the media sharing session similarly to the camera video signal. The local client system may control the shared screen's size and position.

When the client system is sharing the screen, the screen could also be on-demand, where there is a visual indicator on a participant UI control that a screen share is available for viewing by other participants. Using this feature, by interacting with the participant UI control, the screen-share stream of the originating participant is available for viewing.

DMMSS 100 may provide for sharing a document. The document can be shared via media tracks and/or data track. The shared document is displayed on the UI(s) of the participant client system(s) with which it is shared. For example, a document may be shared within a UI zone that contains a local participant UI control and remote participant UI control. When a request is received on client system 110A to modify the shared document, the document may be modified on local UI 114A. The modification(s) are sent to remote client system 110B and displayed on remote UI 114B. Similarly, the modification by remote client system 110B is received and displayed on the document on local client system 110A. Thereby, the shared document is concurrently modified by local and remote client system 110A/B. The content of the document may be source code, and further actions (e.g., compiling/running) may be similarly performed using DMMSS 100.

In an embodiment, the sharing of a document may be initiated by participation or actions within the media session in which it is shared. For example, a trigger may be defined, which, if activated by local client system 110A, automatically requests access for user A for the document available in the media session. The trigger may be initiating/connecting to the media session by local client system 110A. Another trigger may be moving local participant UI control 206AA into a UI zone in which the document is available.

DMMSS 100 may originate media streaming itself. DMMSS 100 may represent media sharing UI control, which, when interacted with by participants, may be activated to share the stream with the streaming session. For example, DMMSS 100 may provide a whiteboard UI control, which, when approached by (or interacted with) a participant UI control is activated. DMMSS 100 may provide textual stream sharing within the session, such as chat.

Such a media sharing UI control may be used to share media with one or more participant client systems. For example, by dragging a picture on a whiteboard, sharing a presentation, and using special controls to create media (like writing on a whiteboard).

Other formats of media for sharing may include text messaging/chat. The UI space may include UI controls for chat. For example, each participant UI control may include a UI control, which when selected initiate a textual media sharing with the corresponding client system. In an embodiment, a client system may initiate a textual media sharing with any other client system regardless of whether the corresponding participant UI controls are within the same UI zone. In an alternative embodiment, the textual media sharing is disabled between client systems which participant UI controls are not in the same UI zone or are not outside of any UI zone.

The techniques discussed herein are not limited to any particular type or format of digital media. Any type or format of digital media may be used for sharing in a media session.

INTERACTIVE MEDIA SESSION UI

As described above, DMMSS 100 displays the movement of the UI control based on the interaction requests from the users' input device. Thus, each user may control her own participant UI control on local UI 114A of local client system 110A, which gets reflected on all other remote client systems' UI's. Conversely, all the actions of remote users are reflected through remote participant UI controls displayed on the local UI. Observing such actions, each user may receive social cues from the behavior on its UI of other users.

In an embodiment, local client system 110A in a media session may receive an input request to browse the local UI of the media session to observe in closer details the social cues of other remote users. Based on the request and without moving the local participant UI control on the local UI, the local client system may zoom in/out of a particular area of the UI and/or UI zone. Accordingly, the local client system may display zoom in/zoom out of a UI zone according to the corresponding interaction request from the input device(s). Local client system 110A may display higher quality UI controls and video streams of the displayed UI area. Accordingly, if local client system 110A displays a UI zone, the video stream of the UI zone before zooming in may have been displayed lower quality, and when zoomed in, it is displayed with high quality.

In an embodiment, when browsing through the local UI, the local user receives media streams uninterrupted regardless of its browsing location within the local UI. Even if, per the request received, the local UI displays a portion of the media session in which local participant UI control is not reflected, local client system 110A may continue to receive from, send to, and playback media stream(s) uninterrupted based on techniques described herein.

For example, local client system 110A may be reproducing audio and video stream from remote system 110B when receiving a request from local user A to zoom in into a UI zone that does not contain remote participant UI control 206BA on local participant UI 114A. While continuing to reproduce the audio track from the media stream received from remote, local client system 110A may display only the UI zone that excludes remote participant UI control 206BA (and as a further example, local participant UI control 206AA).

In an embodiment, DMMSS 100 provides a participant UI control handshake feature when two or more participant UI controls touch each other on the session UI in a specific way. A handshake may be displayed. Alternatively or additionally, the touching of participant UI controls may cause generating a UI zone for the touched participant UI controls. Thereby, the respective users may engage with each other privately using techniques described herein.

In an embodiment, DMMSS 100 determines the display size of a remote participant UI control based on the proximity to the local participant UI control on the local UI of local client system 110A. DMMSS 100 calculates the proximity based on the techniques described herein for calculating the proximity for modifying media stream(s) from the remote client system.

DMMSS 100 has a widget-based architecture for the participant UI controls and thus may be customized per each user. Also, using this technique, DMMSS 100 may provide predefined designed skins, which DMMSS 100 may periodically update and add special skins.

SOFTWARE OVERVIEW

Figure 4:
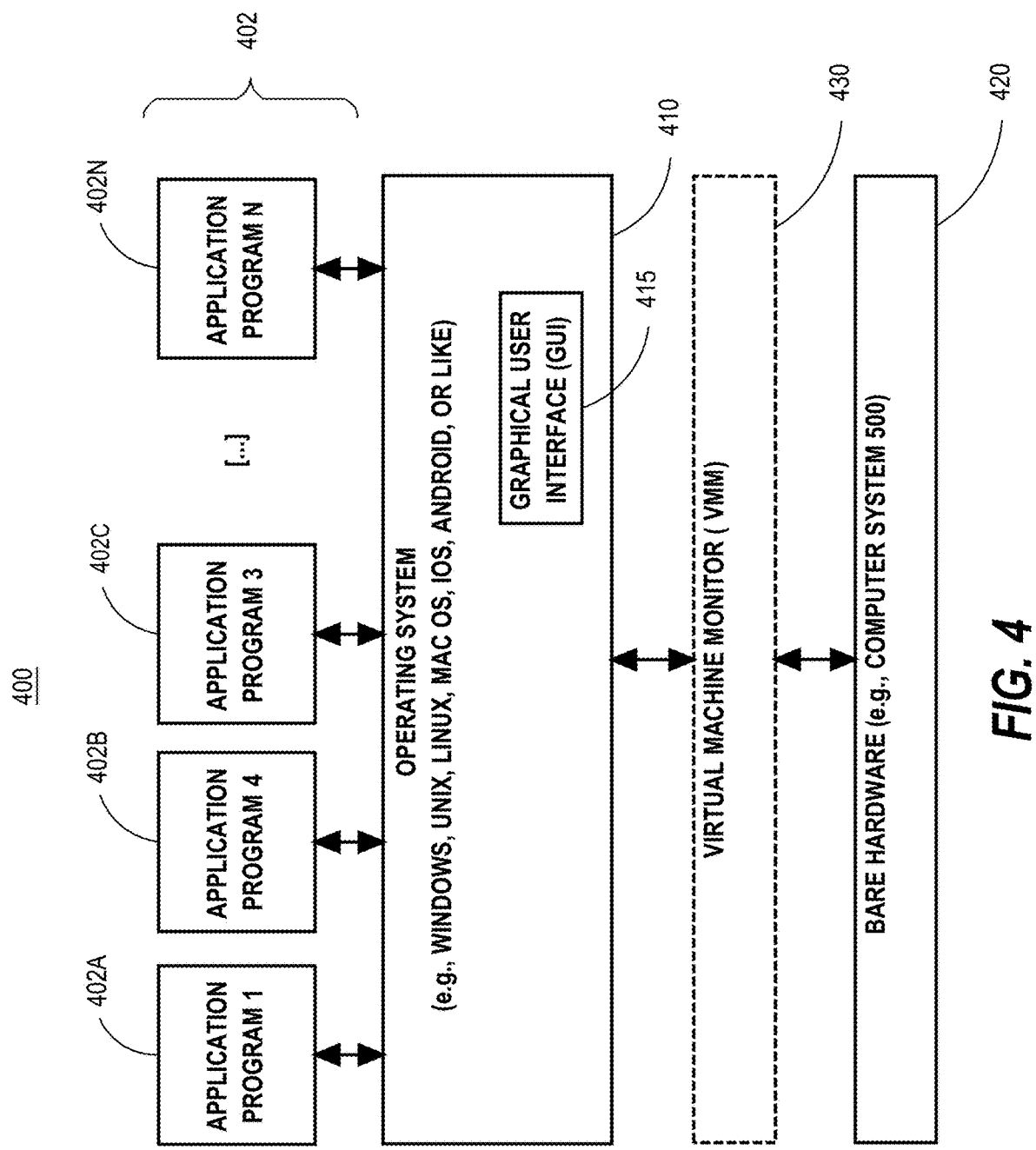
FIG. 4 is a block diagram of a basic software system, in one or more embodiments.
Figure 5:
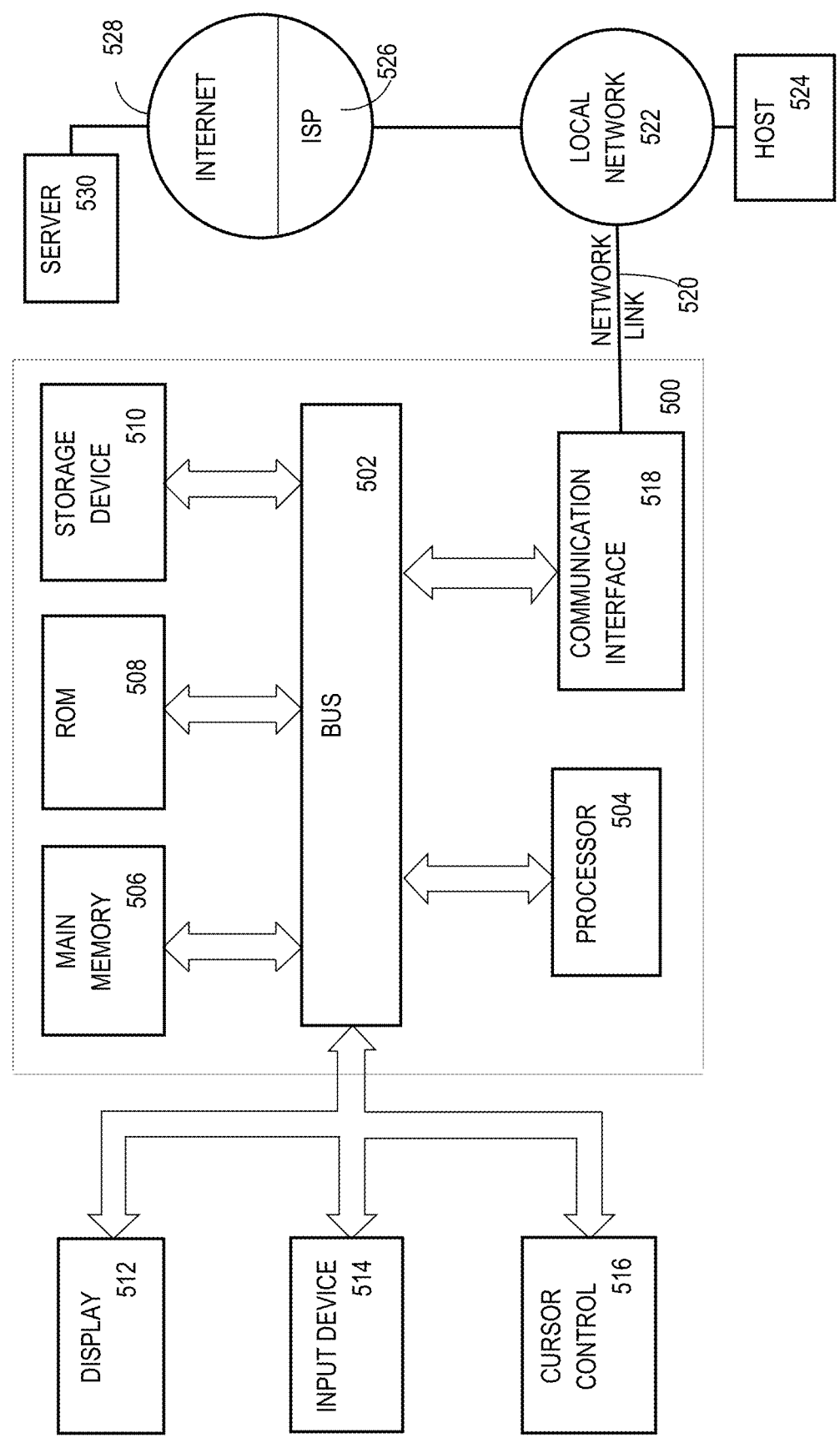
FIG. 5 is a block diagram that illustrates a computer system upon which an embodiment of the invention may be implemented.

FIG. 4 is a block diagram of a basic software system 400 that may be employed for controlling the operation of computing system 500 of FIG. 5. Software system 400 and its components, including their connections, relationships, and functions, are meant to be exemplary only and not meant to limit implementations of the example embodiment(s). Other software systems suitable for implementing the example embodiment(s) may have different components, including components with different connections, relationships, and functions.

Software system 400 is provided for directing the operation of computing system 500. Software system 400, which may be stored in system memory (RAM) 506 and on fixed storage (e.g., hard disk or flash memory) 510, includes a kernel or operating system (OS) 410.

The OS 410 manages low-level aspects of computer operation, including managing execution of processes, memory allocation, file input and output (I/O), and device I/O. One or more application programs represented as 402A, 402B, 402C . . . 402N, may be "loaded" (e.g., transferred from fixed storage 510 into memory 506) for execution by the system 400. The applications or other software intended for use on computer system 500 may also be stored as a set of downloadable computer-executable instructions, for example, for downloading and installation from an Internet location (e.g., a Web server, an app store, or another online service).

Software system 400 includes a graphical UI (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 504) of computer system 500. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 500.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 500 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time and an allotment of memory (physical and/or virtual), the allotment of memory being for storing instructions executed by the hardware processor, for storing data generated by the hardware processor executing the instructions, and/or for storing the hardware processor state (e.g., the content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but share access to the memory allotted to the process. The memory is used to store the content of processors between the allotments when the thread is not running. The term thread may also be used to refer to a computer system process in multiple threads that are not running.

HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field-programmable gate arrays (FPGAs) that are persistently programmed to perform the techniques, or may include one or more general-purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or another communication mechanism for communicating information, and a hardware processor 504 coupled with bus 502 for processing information. Hardware processor 504 may be, for example, a general-purpose microprocessor.

Computer system 500 also includes a main memory 506, such as a random access memory (RAM) or another dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read-only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which, in combination with the computer system, causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal, and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or data equipment operated by an Internet Service Provider (ISP) 526. ISP 526, in turn, provides data communication services through the world wide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520, and communication interface 518. In the Internet example, a server 530 might transmit a requested code for an application program through Internet 528, ISP 526, local network 522, and communication interface 518.

The received code may be executed by processor 504 as it is received and/or stored in storage device 510 or other non-volatile storage for later execution.

Computing Nodes and Clusters

A computing node is a combination of one or more hardware processors that each share access to a byte-addressable memory. Each hardware processor is electronically coupled to registers on the same chip of the hardware processor and is capable of executing an instruction that references a memory address in the addressable memory, and that causes the hardware processor to load data at that memory address into any of the registers. In addition, a hardware processor may have access to its separate exclusive memory that is not accessible to other processors. The one or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratchpad memory that cannot be accessed by any other core processor of the multiple core processors.

A cluster comprises computing nodes that each communicate with each other via a network. Each node in a cluster may be coupled to a network card or a network-integrated circuit on the same board of the computing node. Network communication between any two nodes occurs via the network card or network integrated circuit on one of the nodes and a network card or network integrated circuit of another of the nodes. The network may be configured to support remote direct memory access.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
receiving, by a first client computer system associated with a first user, a media stream originated from a second client computer system associated with a second user;
displaying, at a first position of a first user interface (UI) of the first client computer system, a first participant UI control representing the first user on the first UI and displaying, at a second position on the first UI, a second participant UI control representing the second user on the first UI;
receiving a request for moving the first participant UI control to a new position, different from the first position, on the first UI;
based at least in part on proximity of the new position of the first participant UI control with a current position of the second participant UI control on the first UI, causing modification of at least a portion of the media stream originated from the second client computer system;
sending coordinate information about the new position to a plurality of client computer systems that include the second client computer system and that are in a media session with the first client computer system and the second client computer system;
causing displaying each of a plurality copies of the first participant UI control displayed on each UI of the plurality of client computer systems at a respective position corresponding to the new position of the first client computer system.

2. The method of claim 1, wherein the modification of at least the portion of the media stream from the second client computer system comprises adjusting an audio level of the media stream originated from the second client computer system.

3. The method of claim 1, wherein the modification of at least the portion of the media stream from the second client computer system comprises adjusting an audio level of the media stream originated from the second client computer system based at least in part on a change in a proximity of the first position with the second position and the proximity of the new position with the current position.

4. The method of claim 1, further comprising causing modification of the first participant UI control or the second participant UI control based at least in part on a proximity of the new position with the current position.

5. A computer-implemented method comprising:
receiving, by a first client computer system associated with a first user, a media stream originated from a second client computer system associated with a second user;
displaying, at a first position of a first user interface (UI) of the first client computer system, a first participant UI control representing the first user on the first UI and displaying, at a second position on the first UI, a second participant UI control representing the second user on the first UI;
receiving a request for moving the first participant UI control to a new position, different from the first position, on the first UI;
based at least in part on proximity of the new position of the first participant UI control with a current position of the second participant UI control on the first UI, causing modification of at least a portion of the media stream originated from the second client computer system;
receiving a plurality of moving requests that include the request for the moving the first participant UI control to the new position on the first UI,
wherein the plurality of moving requests further include one or more requests to move the first participant UI control through a plurality of positions that start at the first position and end at the new position;
determining that the request for the moving the first participant UI control to the new position on the first UI satisfies criteria for pooling the plurality of positions into a move data pool;
sending the move data pool about at least a subset of the plurality of positions to the second client computer system thereby causing displaying moving a corresponding first participant UI control of the first participant UI control on a second UI of the second client computer system.

6. The method of claim 5, wherein the criteria for pooling the plurality of positions is based at least in part on time periods between the plurality of moving requests or on one or more distances between the plurality of positions.

7. A computer-implemented method comprising:
receiving, by a first client computer system associated with a first user, a media stream originated from a second client computer system associated with a second user;
displaying, at a first position of a first user interface (UI) of the first client computer system, a first participant UI control representing the first user on the first UI and displaying, at a second position on the first UI, a second participant UI control representing the second user on the first UI;
receiving a request for moving the first participant UI control to a new position, different from the first position, on the first UI;
based at least in part on proximity of the new position of the first participant UI control with a current position of the second participant UI control on the first UI, causing modification of at least a portion of the media stream originated from the second client computer system;
receiving, from the second client computer system, at least one coordinate that indicates a move, on a second UI, of a corresponding second participant UI control of the second participant UI control to the at least one coordinate;
calculating at least one intermediary coordinate between the second position and a fourth position corresponding to the at least one coordinate of the second UI;
displaying, on the first UI, a move by the second participant UI control through the at least one intermediary coordinate to the fourth position thereby mirroring the move of the corresponding second participant UI control on the second UI.

8. The method of claim 7, wherein calculating at least one intermediary coordinate between the second position and the fourth position comprises providing data for the second position and the fourth position as part of input to a machine learning model and receiving the at least one intermediary coordinate as part of output of the machine learning model.

9. A computer-implemented method comprising:
displaying, at a first position on a first UI (UI) of a first client computer system, a first participant UI control associated with a first user of the first client computer system,
receiving, by the first client computer system from a second client computer system associated with a second user, location information of a second participant UI control associated with the second user for displaying the second participant UI control on the first UI;
based at least in part on the location information of the second participant UI control, determining a second position on the first UI for displaying the second participant UI control on the first UI;
based at least in part on one or more UI zones of the first UI and relation of the one or more UI zones to the second position of the second participant UI control and to the first position of the first participant UI control, determining:
  a) whether to send at least a portion of a first media stream, associated with the first user, from the first client computer system to the second client computer system, or
  b) whether to playback, by the first client computer system, at least a portion of a second media stream associated with the second user and received from the second client computer system.

10. The method of claim 9, further comprising:
determining that the second position of the second participant UI control and the first position of the first participant UI control are in a same particular UI zone of the one or more UI zones;
based at least in part on determining that the second position of the second participant UI control and the first position of the first participant UI control are in the same particular UI zone:
  a) sending at least the portion of the first media stream associated with the first user from the first client computer system to the second client computer system, or
  b) playing back, by the first client computer system, at least the portion of the second media stream associated with the second user and received from the second client computer system.

11. The method of claim 9, further comprising:
determining that the second position of the second participant UI control is outside a particular UI zone of the one or more UI zones and the first position of the first participant UI control is inside the particular UI zone of the one or more UI zones;
based at least in part on determining that the second position of the second participant UI control is outside the particular UI zone and the first position of the first participant UI control is in the particular UI zone:
  a) causing at the portion of the first media stream associated with the first user from the first client computer system to the second client computer system to be discarded, or
  b) discarding, by the first client computer system, at least a portion of the second media stream associated with the second user received from the second client computer system.

12. The method of claim 9, wherein each of the one or more UI zones delineate one or more positions for participant UI controls to have media streams of the participant UI controls at least in part isolated from media streams other participants, which are positioned outside of said each of the one or more UI zones.

13. The method of claim 9, further comprising:
determining that a third position of a third participant UI control associated with a third user of a third client computer system is outside a particular UI zone of the one or more UI zones of the first UI and the first position of the first participant UI control is inside the particular UI zone;
determining that the first media stream associated with the first user from the first client computer system is in a broadcast mode;
despite the third position of the third participant UI control being outside the particular UI zone in which the first position of the first participant UI control is located, sending at least the portion of the first media stream associated with the first user from the first client computer system to the third client computer system;
determining that the second media stream associated with the first user from the first client computer system is not in a broadcast mode;
causing at least a portion of the second media stream associated with the first user from the first client computer system to the third client computer system to be discarded.

14. The method of claim 9, further comprising:
receiving a request, from the first client computer system of the first user, to move the first participant UI control of the first user into a particular UI zone of the one or more UI zones of the first UI;
wherein the particular UI zone has at least one media stream providing a document having access control list excluding the first user;
wherein the request to move the first participant UI control into the particular UI zone causes an access request for the document.

15. The method of claim 9, further comprising:
determining that the second position of the second participant UI control and the first position of the first participant UI control are in a same particular UI zone of the one or more UI zones;
displaying, by the first client computer system, content of a document within the particular UI zone on the first UI;
receiving a first request, from the first client computer system of the first user, to modify the content of the document with first changes to the content;
re-displaying new content of the document with the first changes to the content and with a second changes to the content caused by a second request, from the second client computer system of the second user, to modify the content of the document with second changes.

16. A system comprising:
one or more processors;
one or more storage media storing a set of instructions, which, when executed by the one or more processors, cause:
  receiving, by a first client computer system associated with a first user, a media stream originated from a second client computer system associated with a second user;
  displaying, at a first position of a first user interface (UI) of the first client computer system, a first participant UI control representing the first user on the first UI and displaying, at a second position on the first UI, a second participant UI control representing the second user on the first UI;

receiving a request for moving the first participant UI control to a new position, different from the first position, on the first UI;

based at least in part on proximity of the new position of the first participant UI control with a current position of the second participant UI control on the first UI, causing modification of at least a portion of the media stream originated from the second client computer system;

sending coordinate information about the new position to a plurality of client computer systems that include the second client computer system and that are in a media session with the first client computer system and the second client computer system;

causing displaying each of a plurality copies of the first participant UI control displayed on each UI of the plurality of client computer systems at a respective position corresponding to the new position of the first client computer system.

17. The system of claim 16, wherein the set of instructions comprises instructions, which, when executed by the one or more processors, further cause adjusting an audio level of the media stream originated from the second client computer system.

18. The system of claim 16, wherein the set of instructions comprises instructions, which, when executed by the one or more processors, further cause adjusting an audio level of the media stream originated from the second client computer system based at least in part on a change in a proximity of the first position with the second position and the proximity of the new position with the current position.

19. The system of claim 16, wherein the set of instructions comprises instructions, which, when executed by the one or more processors, further cause modification of the first participant UI control or the second participant UI control based at least in part on a proximity of the new position with the current position.

20. A system comprising:
one or more processors;
one or more storage media storing a set of instructions, which, when executed by the one or more processors, cause:
receiving, by a first client computer system associated with a first user, a media stream originated from a second client computer system associated with a second user;
displaying, at a first position of a first user interface (UI) of the first client computer system, a first participant UI control representing the first user on the first UI and displaying, at a second position on the first UI, a second participant UI control representing the second user on the first UI;
receiving a request for moving the first participant UI control to a new position, different from the first position, on the first UI;
based at least in part on proximity of the new position of the first participant UI control with a current position of the second participant UI control on the first UI, causing modification of at least a portion of the media stream originated from the second client computer system;
receiving a plurality of moving requests that include the request for the moving the first participant UI control to the new position on the first UI,
wherein the plurality of moving requests further include one or more requests to move the first participant UI control through a plurality of positions that start at the first position and end at the new position;
determining that the request for the moving the first participant UI control to the new position on the first UI satisfies criteria for pooling the plurality of positions into a move data pool;
sending the move data pool about at least a subset of the plurality of positions to the second client computer system thereby causing displaying moving a corresponding first participant UI control of the first participant UI control on a second UI of the second client computer system.

21. The system of claim 20, wherein the criteria for pooling the plurality of positions is based at least in part on time periods between the plurality of moving requests or on one or more distances between the plurality of positions.

22. A system comprising:
one or more processors;
one or more storage media storing a set of instructions, which, when executed by the one or more processors, cause:
receiving, by a first client computer system associated with a first user, a media stream originated from a second client computer system associated with a second user;
displaying, at a first position of a first user interface (UI) of the first client computer system, a first participant UI control representing the first user on the first UI and displaying, at a second position on the first UI, a second participant UI control representing the second user on the first UI;
receiving a request for moving the first participant UI control to a new position, different from the first position, on the first UI;
based at least in part on proximity of the new position of the first participant UI control with a current position of the second participant UI control on the first UI, causing modification of at least a portion of the media stream originated from the second client computer system;
receiving, from the second client computer system, at least one coordinate that indicates a move, on a second UI, of a corresponding second participant UI control of the second participant UI control to the at least one coordinate;
calculating at least one intermediary coordinate between the second position and a fourth position corresponding to the at least one coordinate of the second UI;
displaying, on the first UI, a move by the second participant UI control through the at least one intermediary coordinate to the fourth position thereby mirroring the move of the corresponding second participant UI control on the second UI.

23. The system of claim 22, wherein the set of instructions comprises instructions, which, when executed by the one or more processors, further cause providing data for the second position and the fourth position as part of input to a machine learning model and receiving the at least one intermediary coordinate as part of output of the machine learning model.

24. A system comprising:
one or more processors;
one or more storage media storing a set of instructions, which, when executed by the one or more processors, cause:
  displaying, at a first position on a first UI (UI) of a first client computer system, a first participant UI control associated with a first user of the first client computer system,
  receiving, by the first client computer system from a second client computer system associated with a second user, location information of a second participant UI control associated with the second user for displaying the second participant UI control on the first UI;
  based at least in part on the location information of the second participant UI control, determining a second position on the first UI for displaying the second participant UI control on the first UI;
  based at least in part on one or more UI zones of the first UI and relation of the one or more UI zones to the second position of the second participant UI control and to the first position of the first participant UI control, determining:
    a) whether to send at least a portion of a first media stream, associated with the first user, from the first client computer system to the second client computer system, or
    b) whether to playback, by the first client computer system, at least a portion of a second media stream associated with the second user and received from the second client computer system.

25. The system of claim 24, wherein the set of instructions comprises instructions, which, when executed by the one or more processors, further cause:
  determining that the second position of the second participant UI control and the first position of the first participant UI control are in a same particular UI zone of the one or more UI zones;
  based at least in part on determining that the second position of the second participant UI control and the first position of the first participant UI control are in the same particular UI zone:
    a) sending at least the portion of the first media stream associated with the first user from the first client computer system to the second client computer system, or
    b) playing back, by the first client computer system, at least the portion of the second media stream associated with the second user and received from the second client computer system.

26. The system of claim 24, wherein the set of instructions comprises instructions, which, when executed by the one or more processors, further cause:
  determining that the second position of the second participant UI control is outside a particular UI zone of the one or more UI zones and the first position of the first participant UI control is inside the particular UI zone of the one or more UI zones;
  based at least in part on determining that the second position of the second participant UI control is outside the particular UI zone and the first position of the first participant UI control is in the particular UI zone:
    a) causing at the portion of the first media stream associated with the first user from the first client computer system to the second client computer system to be discarded, or
    b) discarding, by the first client computer system, at least a portion of the second media stream associated with the second user received from the second client computer system.

27. The system of claim 24, wherein each of the one or more UI zones delineate one or more positions for participant UI controls to have media streams of the participant UI controls at least in part isolated from media streams other participants, which are positioned outside of said each of the one or more UI zones.

28. The system of claim 24, wherein the set of instructions comprises instructions, which, when executed by the one or more processors, further cause:
  determining that a third position of a third participant UI control associated with a third user of a third client computer system is outside a particular UI zone of the one or more UI zones of the first UI and the first position of the first participant UI control is inside the particular UI zone;
  determining that the first media stream associated with the first user from the first client computer system is in a broadcast mode;
  despite the third position of the third participant UI control being outside the particular UI zone in which the first position of the first participant UI control is located, sending at least the portion of the first media stream associated with the first user from the first client computer system to the third client computer system;
  determining that the second media stream associated with the first user from the first client computer system is not in a broadcast mode;
  causing at least a portion of the second media stream associated with the first user from the first client computer system to the third client computer system to be discarded.

29. The system of claim 24, wherein the set of instructions comprises instructions,
  which, when executed by the one or more processors, further cause:
  receiving a request, from the first client computer system of the first user, to move the first participant UI control of the first user into a particular UI zone of the one or more UI zones of the first UI;
  wherein the particular UI zone has at least one media stream providing a document having access control list excluding the first user;
  wherein the request to move the first participant UI control into the particular UI zone causes an access request for the document.

30. The system of claim 24, wherein the set of instructions comprises instructions,
  which, when executed by the one or more processors, further cause:
  determining that the second position of the second participant UI control and the first position of the first participant UI control are in a same particular UI zone of the one or more UI zones;
  displaying, by the first client computer system, content of a document within the particular UI zone on the first UI;
  receiving a first request, from the first client computer system of the first user, to modify the content of the document with first changes to the content;
  re-displaying new content of the document with the first changes to the content and with a second changes to the content caused by a second request, from the second client computer system of the second user, to modify the content of the document with second changes.

* * * * *